(12) United States Patent
Tahara

(10) Patent No.: US 6,249,361 B1
(45) Date of Patent: *Jun. 19, 2001

(54) IMAGE PROCESSING APPARATUS AND METHOD

(75) Inventor: Motoaki Tahara, Numazu (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/008,555

(22) Filed: Jan. 16, 1998

(30) Foreign Application Priority Data

Jan. 20, 1997 (JP) .................................................. 9-007460

(51) Int. Cl.⁷ .............................. H04N 1/04; H04N 1/387

(52) U.S. Cl. ........................ 358/474; 358/1.13; 358/452

(58) Field of Search ................................. 382/167, 318, 382/319; 358/1.18, 1.13, 1.16, 1.17, 406, 504, 474, 452, 450

(56) References Cited

U.S. PATENT DOCUMENTS

| | | | |
|---|---|---|---|
| 5,164,831 | * 11/1992 | Kuchta et al. | 358/209 |
| 5,384,862 | * 1/1995 | Echerer et al. | 382/6 |
| 5,472,182 | * 12/1995 | Han | 271/3.13 |
| 5,706,097 | * 1/1998 | Schelling et al. | 358/296 |
| 5,706,457 | * 1/1998 | Dwyer et al. | 395/349 |
| 5,717,838 | * 2/1998 | LeClair | 395/109 |
| 5,790,708 | * 8/1998 | Delean | 382/276 |

OTHER PUBLICATIONS

OmniPage Pro for Windows 95, Caere Corporation, pp. 4–10, Apr. 1996.*

Reference manual for SCANPORT scanners and Twain–compliant scanning software (PC version), copyright 1996.*

PR Newswire release, p619LA065, "Microtek introduces next generation of scanning software", by Mark Ann Whitlock, Jun. 19, 1995.*

* cited by examiner

Primary Examiner—Amelia M. Au
Assistant Examiner—Martin Miller
(74) Attorney, Agent, or Firm—Fitzpatrick, Cella, Harper & Scinto

(57) ABSTRACT

When edit processing is to be performed for a plurality of originals to form visible images, all the originals are edited at once, and the resultant images are output. A DH (130) sequentially conveys originals to a read surface. A CCD (105) reads original images. When nine original images are completely read, the nine read original images are displayed on a CRT (131) to allow the user to perform edit processing for a desired original. The edit contents are stored in a predetermined storage device. When edit processing for the displayed original images is complete, the next nine originals are processed in the same manner as described above. When a series of edit operations are completed in this manner, and a copy instruction is given, a read operation is performed again from the first original, and each original is edited in accordance with the stored edit contents. The resultant images are then printed out.

26 Claims, 18 Drawing Sheets

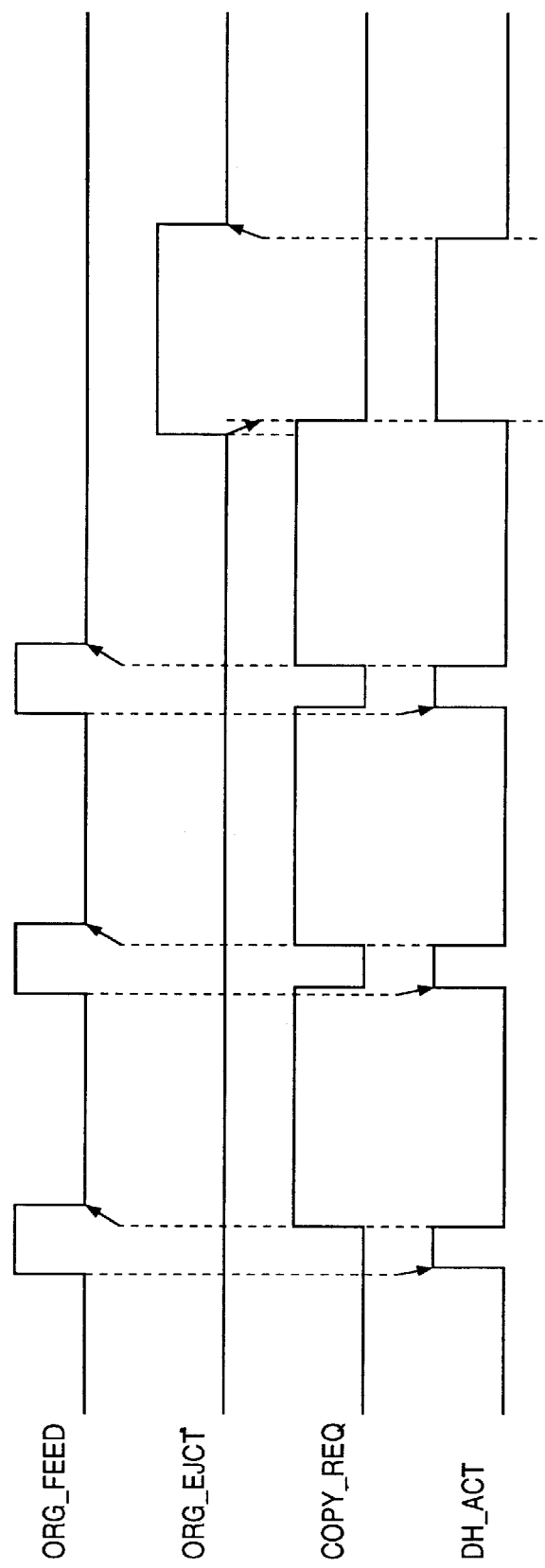

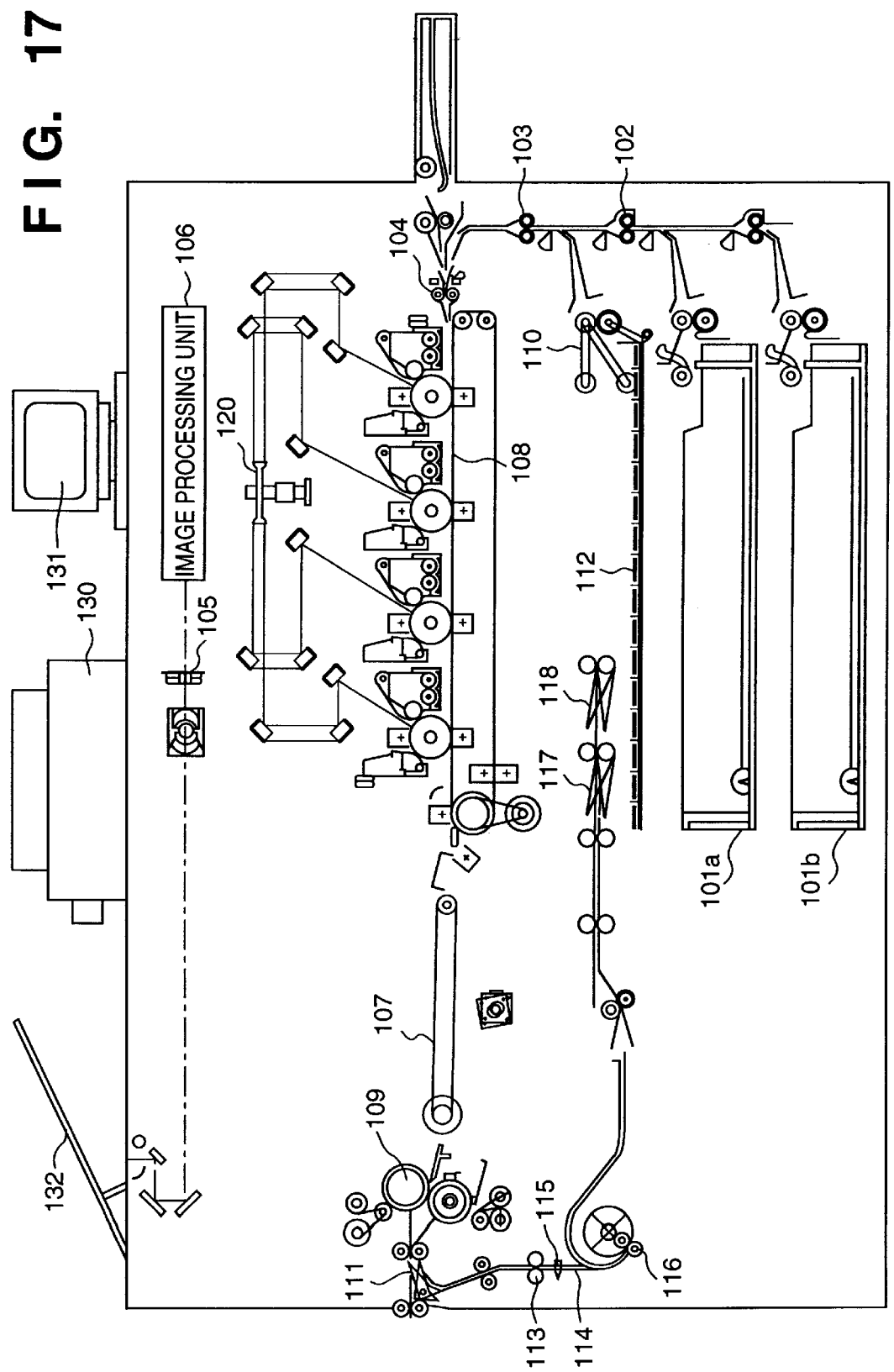

IMAGE PROCESSING APPARATUS AND METHOD

BACKGROUND OF THE INVENTION

1. Field of the Invention

The present invention relates to an image processing apparatus and method and, more particularly, to an image processing apparatus for reading an original image and forming a visible image on a predetermined recording medium, and a method therefor.

2. Related Background Art

Recent advances in digital color processing techniques have considerably met users' demands on the color appearances of output images and edit processing as well as the image quality and performance of copying machines.

In general, to obtain a desired output image, images are repeatedly output on paper sheets, and the edit contents are checked every time an image is output. With this operation, paper sheets are wasted. Under the circumstances, copying machines having a so-called preview function of displaying an image on a CRT or the like and allowing the user to check the image before a printout operation has become commercially available.

Some of these apparatuses displays a read original image on a black-and-white liquid crystal display and allow the user to check the image. If, however, the main body is a color copying machine, the color appearance of the output image cannot be checked. For this reason, a preview system capable of full-color display is preferably used as a display unit.

Recently, digital color copying machines which allow connection of applications such as a document handler and a sorter to improve the productivity have also become commercially available.

All the preview systems describe above check edit effects on only one original image. When, therefore, the output states of a plurality of originals under edit settings set by the operator are to be checked, the operator must switch the originals one by one to check edit effects on all the originals by preview images, or must check edit effects by actually printing out images. In the former case, it takes time for the operator to switch the originals, posing a problem in terms of productivity. In the latter case, if an output image differs from operator's intention, the output paper sheet is wasted, posing a problem in terms of cost.

SUMMARY OF THE INVENTION

The present invention has been made in consideration of the above problems, and has as its object to provide an image processing apparatus and method in which when edit processing is to be performed for a plurality of originals to form visible images, all the originals are edited at once, and the resultant images are output.

To achieve the above object, according to the present invention, for example, there is provided an image processing apparatus for receiving an original image and outputting the original image upon performing edit processing therefor in accordance with an edit processing condition, comprising:

input means for inputting a plurality of original images;

setting means for arbitrarily setting an edit processing condition for each of the plurality of original images input by the input means;

display means for simultaneously displaying processing results obtained by processing the plurality of original images in accordance with the edit processing conditions set by the setting means in correspondence with the respective original images;

storage means for storing the edit processing conditions set by the setting means in correspondence with the original images for which the edit processing conditions are set;

instruction means for instructing an image output; and output means for processing each of the plurality of original images, in response to the instruction, in accordance with the edit processing conditions stored in the storage means in correspondence with the respective original images, and outputting the original images.

In addition, according to the present invention, there is provided an image processing apparatus for receiving an original image and outputting the original image upon performing edit processing therefor in accordance with an edit processing condition, comprising:

input means for inputting a plurality of original images;

setting means for arbitrarily setting an edit processing condition for each of the plurality of original images input by the input means;

storage means for storing the edit processing conditions set by the setting means in correspondence with the original images for which the edit processing conditions are set;

instruction means for instructing an image output; and output means for processing each of the plurality of original images, in response to the instruction, in accordance with the edit processing conditions stored in the storage means in correspondence with the respective original images, and outputting the original images.

Furthermore, according to the present invention, there is provided an image processing method of receiving an original image and outputting the original image upon performing edit processing therefor in accordance with an edit processing condition, comprising:

the input step of inputting a plurality of original images;

the setting step of arbitrarily setting an edit processing condition for each of the plurality of original images input in the input step;

the display step of simultaneously displaying processing results obtained by processing the plurality of original images in accordance with the edit processing conditions set in the setting step in correspondence with the respective original images;

the storage step of storing the edit processing conditions set in the setting step in correspondence with the original images for which the edit processing conditions are set;

the instruction step of instructing an image output; and the output step of processing each of the plurality of original images, in response to the instruction, in accordance with the edit processing conditions stored in the storage step in correspondence with the respective original images, and outputting the original images.

Moreover, according to the present invention, there is provided an image processing method of receiving an original image and outputting the original image upon performing edit processing therefor in accordance with an edit processing condition, comprising:

the input step of inputting a plurality of original images;

the setting step of arbitrarily setting an edit processing condition for each of the plurality of original images input in the input step;

the storage step of storing the edit processing conditions set in the setting step in correspondence with the original images for which the edit processing conditions are set;

the instruction step of instructing an image output; and the output step of processing each of the plurality of original images, in response to the instruction, in accordance with the edit processing conditions stored in the storage step in correspondence with the respective original images, and outputting the original images.

Other objects, features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a timing chart showing a preview operation in the embodiment;

FIG. 17 is a sectional view of an apparatus according to a modification of the embodiment.

DETAILED DESCRIPTION OF THE PREFERRED EMBODIMENTS

Embodiments of the present invention will be described in detail below with reference to the accompanying drawings.
[Image Formation Process]

Figure 1:
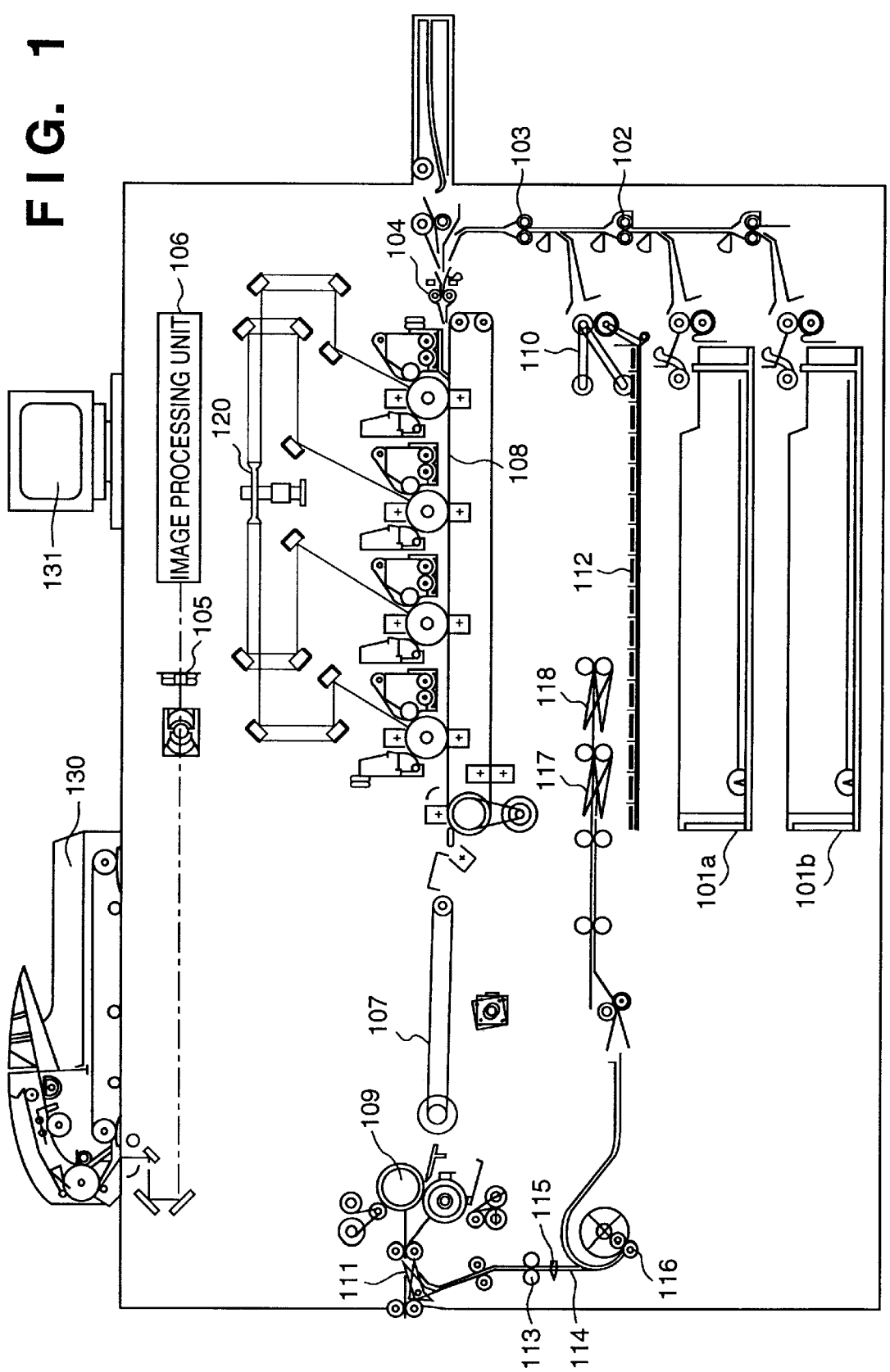
FIG. 1 is a sectional view of a copying machine according to an embodiment of the present invention.

FIG. 1 shows the cross-sectional structure of an image processing apparatus (copying machine) according to an embodiment of the present invention.

This embodiment is an image forming apparatus capable of forming a full-color image using four colors, i.e., yellow (Y), magenta (M), cyan (C), and black (Bk). This apparatus includes four image forming stations which are independently arranged in correspondence with yellow, magenta, cyan, and black.

Figure 3:
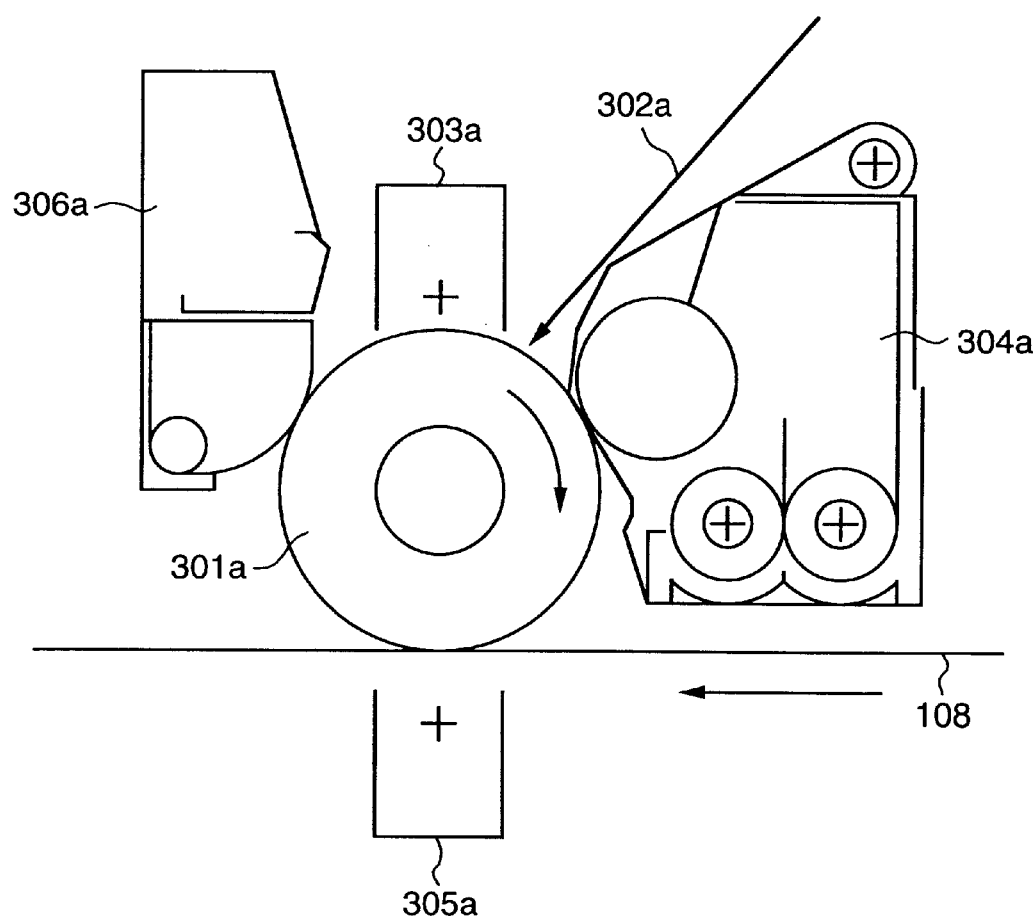
FIG. 3 is a sectional view showing the structure and operation of an image formation unit.

FIG. 3 shows the structure of a yellow station as one of the above four image forming stations. The yellow station has a photosensitive drum 301a as an image carrier. The surface of the each photosensitive drum is uniformly charged by a primary high-voltage charger/grid high-voltage unit 303a. Thereafter, an image corresponding to yellow is formed on the photosensitive drum 301a by exposure with a scanning laser beam 302a based on image information scanned by a laser scanner 120. As a result, an electrostatic latent image is formed. The latent image corresponding to the yellow image information is developed into a toner image by a developing unit 304a having yellow toner. After this operation, the toner image is transferred onto a conveyed transfer medium on a transfer belt 108 as a sheet convey means by a transfer charger 305a. The residual toner on the yellow photosensitive drum is removed by a cleaning unit 306a. As similar image formation processes are performed in the magenta, cyan, and black stations, a description thereof will be omitted.
[Double-sided Image Formation Sequence]

A double-sided image formation sequence in the apparatus arrangement of this embodiment will be described for a case wherein a paper sheet is fed from an upper paper cassette 101a.

The first feed roller solenoid (not shown) is turned on at the same time when an image formation start signal from the operation panel (not shown) is activated. As a result, feeding of a transfer medium (e.g., a recording sheet) P stacked in the paper cassette 101a is started. The transfer medium P fed from the upper paper cassette 101a is conveyed by convey registration rollers 102 and 103. When the leading end of the transfer medium P comes into contact with first registration rollers 104, a predetermined loop is formed, and the transfer medium P temporarily stops.

When an image formation start signal is activated, a document handler 130 feeds an original onto the platen, exposes the original on the platen, and forms an image of the reflected light on a CCD 105. R, G, and B filters are arranged on the CCD 105. The CCD 105 generates image data based on the RGB format. The read image is then sent as R, G, and B image data to an image processing unit 106.

The image processing unit 106 stores the read R, G, and B image data in the internal image memory. After a laser becomes ready to scan, driving of the first registration rollers 104 is started. With this driving operation, the transfer medium P is chucked and conveyed to a predetermined position on the transfer belt to be subjected to an image formation process. As described in [Image Formation Process], images of the respective colors are transferred onto the transfer medium P. At this time, the original image data stored in the memory are read out and converted into color signals of yellow, magenta, cyan, and black at the respective timings at which the transfer medium P passes through the yellow, magenta, cyan, and black stations. The respective color signals are then used to scan/expose the photosensitive drums of the respective colors at the respective timings such that the respective images are superimposed and transferred onto the transfer medium P.

After the transfer medium P sequentially passes through the four stations to have the respective transfer images superimposed/transferred thereon, the transfer medium P is conveyed to the fixing unit by a pre-fixing convey belt 107. Thereafter, toner images are fixed on the transfer medium P by a fixing means (a thermal fixing roller in general) 109 for fixing toners.

In the single-sided copy mode, the transfer medium P having undergone fixing in this manner is discharged outside by the discharge rollers. In the double-sided copy mode, however, the re-feed pickup solenoid (not shown) is turned on when an image formation start signal is activated. As a result, a re-feed roller 110 moves upward to perform a double-sided image formation process. In addition, the paper convey path deflection plate solenoid (not shown) is turned on to actuate a first paper deflection plate 111 so as to form a paper convey path for a double-sided image formation process. At the same time, a paper stopper plate solenoid SL (not shown) in an intermediate tray unit 112 is turned on to actuate the paper stopper plate (not shown) in the intermediate tray unit 112.

When fixing for the first surface is complete, the transfer medium P is conveyed to the double-sided path and then to paper discharge rollers 113 by the first paper deflection plate 111 described above. When the transfer medium P passes a paper reversal sensor 115 placed on a switchback unit (paper reversing unit) 114, forward/reverse rollers 116 rotate in the reverse directions. With this operation, the transfer medium P is switched back and conveyed to the second convey unit. When paper deflection plate solenoids SL7 and SL8 (not shown) are driven in accordance with the size of the transfer medium P, paper-size-based deflection plates 117 and 118 change the convey path of the transfer medium P conveyed in the intermediate tray unit 112.

When the first transfer medium P is conveyed into the intermediate tray, the re-feed pickup solenoid (not shown) is turned off temporarily to move the rotating re-feed roller 110 onto the transfer medium P, thereby bringing the conveyed transfer medium P into contact with the paper stopper plate (not shown).

Transfer media whose first surfaces have undergone image formation after the series of operations described above are sequentially stacked on the intermediate tray unit 112 and stand by for image formation on the second surfaces.

In this state, the re-feed roller 110 is at its lower position on the transfer media stacked on the tray. When a second surface image formation start signal is generated in this state, image formation for the second surfaces is started. More specifically, the re-feed clutch (not shown) is turned on to rotate the re-feed roller 110 so as to feed the uppermost transfer medium P from the tray. When feeding of the first transfer medium is started, the re-feed roller moves upward. When feeding of the first transfer medium is complete, the rotating second feed roller is moved downward at a predetermined timing to feed the next transfer medium (second medium). The re-feed roller 110 repeats this upward/downward movement. Each re-fed transfer medium is conveyed by the convey registration rollers 103, and the leading end of the transfer medium comes into contact with the first registration rollers. As a result, a predetermined loop is formed, and the transfer medium temporarily stops. Thereafter, as in the first surface image formation process, the transfer medium is fixed/conveyed on the transfer belt 108 at a predetermined timing to pass through the first to fourth stations, thereby forming second surface images. Then, fixing of the second surface images is completed. When the second surface image formation process is started, the above first paper deflection plate solenoid (not shown) is turned off. Therefore, each transfer medium having undergone the second surface image formation process and the fixing process is guided to the paper discharge rollers and discharged/stacked onto the paper discharge tray. After the final transfer medium is discharged, all the series of operations are terminated.

[Image Processing Unit]

Figure 2:
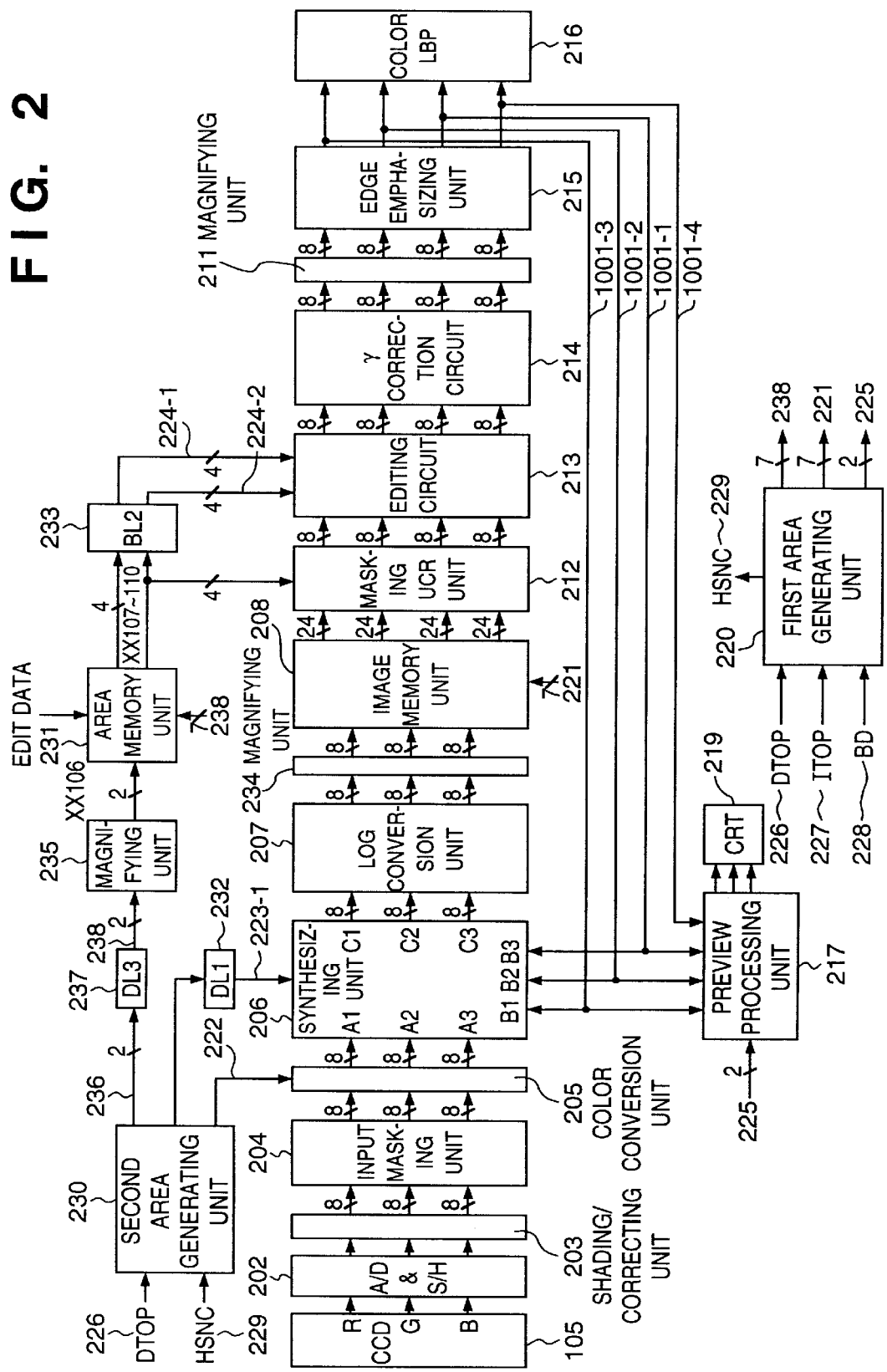
FIG. 2 is a block diagram showing an image processing unit in the embodiment.

FIG. 2 is a block diagram showing a digital image processing unit 160 in the reader. A color original on the original table is exposed with the halogen lamp (not shown). As a result, the reflected image is picked up by the CCD 105, and A/D-converted by a sample/hold & A/D converter 202, thereby generating R, G, and B digital signals. The respective color separation data are subjected to shading and black correction in a shading/correcting unit 203. The resultant data are corrected into NTSC signals by an input masking unit 204. The NTSC signals are then subjected to color conversion in a color conversion unit 205. The resultant data are input to a synthesizing unit 206.

The synthesizing unit 206 synthesizes the reflected original image data with the image data stored in an image memory unit 208. The resultant data is subjected to LOG correction processing in a LOG conversion unit 207 to be converted into density data (yellow, magenta, and cyan). The data are then subjected to magnifying processing (when the magnification mode is set) in a magnifying unit 234.

In this case, as magnifying processing, enlargement processing is performed because compression processing performed by the image memory unit 208 serves as a low-pass filter. In addition, an output from the magnifying unit 234 is input to the image memory unit 208.

The image memory unit 208 is constituted by three units, i.e., a compression unit, an image memory, and an expansion unit. CMY data (24 bits×4) before output masking which correspond to the four drums are read out from the image memory unit 208. Data compression and expansion will be described later.

Reference numeral 212 denotes a masking UCR unit for generating color signals corresponding to the respective drums and suited for the printer characteristics. A black component (Bk) is also generated by the masking UCR unit 212.

Reference numeral 213 denotes an editing circuit for performing edit processing such as free color processing and paint processing on the basis of information from an area memory unit 231. Note that free color processing converts a designated area on an image or its entire area into a halftone image using an arbitrary color. Paint processing paints a designed area on an image or its entire area in an arbitrary color at a uniform density. As described above, the editing circuit 213 outputs image data upon converting a color on an image into a color different from the color of the input image.

The editing result from the editing circuit 213 is sent to a γ correction circuit 214 and a magnifying unit (reduction processing) 211. The resultant data is further edge-emphasized by an edge emphasizing unit 215 and sent to a color LBP 216.

The color LBP 216 corresponds to the printer unit shown in FIG. 1. The color LBP 216 does not print based on a signal from the edge emphasizing unit 215 unless a predetermined driving signal is output. The color LBP 216 operates in this manner to cope with edit processing to be described later.

Reference numeral 217 denotes a preview processing unit constituted by a circuit for converting edited image data (Y, M, C, and Bk data) into display data (R, G, and B data), a CRT image memory for storing the converted image data, and a memory control unit for controlling the CRT image memory; and 219, a CRT for displaying the data in the CRT image memory.

Reference numeral 220 denotes an area generating unit for generating a signal 229 which is either a signal generated from a main scanning sync signal in the unit 220 or a signal BD 228 sent from the color LBP 216, an output DTOP 226 from the image leading end sensor, a signal ITOP (in a printout operation, a subscanning enable signal synchronized with each drum is generated on the basis of this signal) 227 generated in the LBP printer, a total of seven signals 221, i.e., two write enable signals (respectively used for main scanning and subscanning operations) and five read enable signals (one for main scanning and four for subscanning), which are used to control the image memory and the area memory unit 231 in the image memory unit, and enable signals 225 (respectively used for main scanning and subscanning operations) for the CRT image memory in the preview processing unit.

Reference numeral 230 denotes another area generating unit for generating area signals for various types of edit processing. As will be described later, this unit is constituted by a bit map memory unit for storing the respective area signals and a bit map memory control unit for controlling the bit map memory. Data is written in the area generating unit 230 by the CPU for controlling the overall apparatus. Data are read out from the area generating unit 230 in synchronism with the signal DTOP 226 and the signal HSNC 229. The area generating unit 230 outputs a color conversion enable signal 205, an image synthesis enable signal 223-1, and a free color or paint enable signal 236.

The area memory unit 231, delay circuits (DL) 232, 233, and 237, and a magnifying unit 235 form a timing adjusting circuit for synchronizing image signals with area signals.

More specifically, the DL 232 delays a signal 232-2 by a period of time corresponding to color conversion (a signal 233-1 is output). The DL 233 delays a signal from the area memory unit 231 by a period of time corresponding to processing in the output DTOP 226 (a signal 224-2 is output). The DL 237 delays the signal 236 from the area generating unit 230 by a period of time corresponding to "color conversion+image synthesis+LOG processing". The magnifying unit 235 performs enlargement processing under the same control as that on the magnifying unit 234. An area memory unit 231 delays its operation by a period of time corresponding to processing in the image memory unit 208. with this arrangement, area signals with different timings can be handled as one plane.

[Flows of Signals in Image Modes]

The flows of video signals and I/O port settings in the respective modes will be described below with reference to FIG. 2.

[Normal Copy Model]

The flow of image data: 105→202→203→204→205→206 (A input→C output) →207→234→208→212→213→214→211→215→216

[Mode of Displaying RGB Data Edit Processing (Color Conversion) Result on CRT]

The flow of image data: 201→202→203→204→205→206 (A input→B output) →207→234→212→213→214→211→215→217→219

In this mode, data to be written in the memory in the image memory unit 208 changes every time edit contents are corrected in the preview mode. For this reason, every time a write (display on the CRT) is to be performed, an original must be read (the flow of a video signal is repeated from "201").

[Mode of Displaying CMYK Data Edit Processing (Paint and Free Color processing) Result on CRT]

The flow of image data: 201→202→203→204→205→206 (A input→C output) →207→234→208→212→213→214→211→215→217→219

In this mode, data to be written in the memory in the image memory unit 208 is not influenced by edit contents in the preview mode. For this reason, optical scanning is not performed in the second and subsequent writes (display on the CRT), but writes are performed by only changing the edit parameters and reading data from the image memory unit 208 (the flow of a video signal starts from "208").

In addition, a printout operation after a preview check (OK) is performed by only reading data from the image memory unit 208 as in the above case.

[Mode of Displaying Synthesis Result on CRT]

1) The flow of image data in the first image write operation: 201→202→203→204→205→206 (A input→C output)→207→208

2) The flow of image data in a case in which the first image is synthesized with the second image, and the resultant data is written in the image memory unit 208 again:

2-1: an output from the memory: 208→212→213→211→214→215→206

In this case, the data passes through the masking UCR unit 212, and an inverse LOG table is set for γ correction.

2-2: the flow of reflected original image data: 201→202→203→204→205→206

3) Synthesis and CRT output:
206→207→208 (memory write)
208→212→213→214→211→215→217→219

Figure 4:
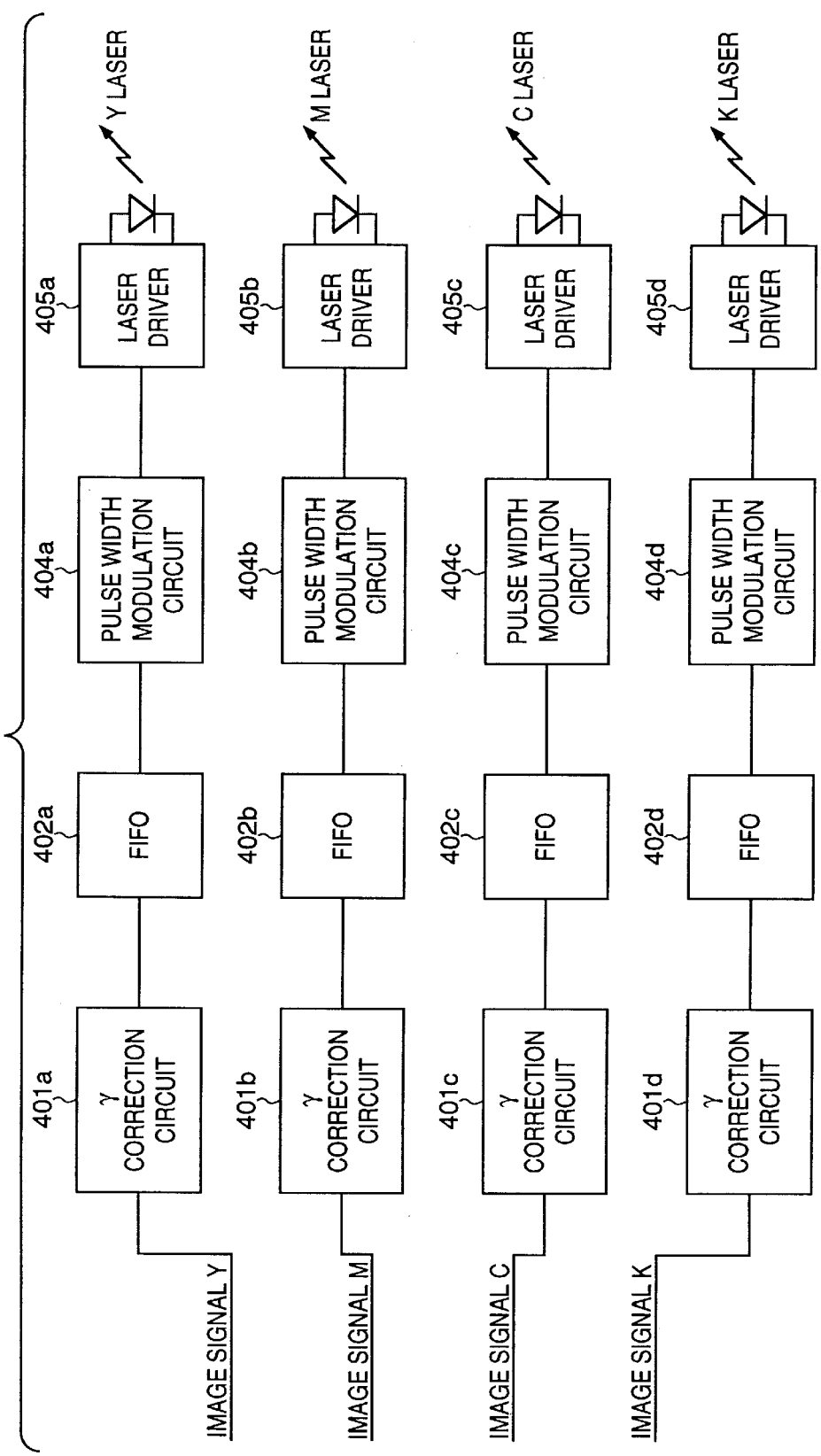
FIG. 4 is a block diagram showing the image signal processing circuit of a printer unit.

FIG. 4 shows the flow of image data in the printer unit. Y, M, C, and K image signals sent from the reader are subjected to γ correction in γ correction circuits 401a to 401d in accordance with the sensitivities of the respective photosensitive members. After that, the Y and M image data are synchronized in FIFOs 402a to 402d. The C and K image data are scanned as mirror images by the laser scanner 120. For this reason, the main scanning data are inverted in LIFO circuits 403a and 403b to be synchronized. Subsequently, the image signals of the respective colors are converted into pulse widths corresponding to the gradation data by pulse width modulation circuits 404a to 404d. Laser drivers 405a to 405d emit laser beams corresponding to the pulse widths.

[Image Synchronization Control]

Figure 5:
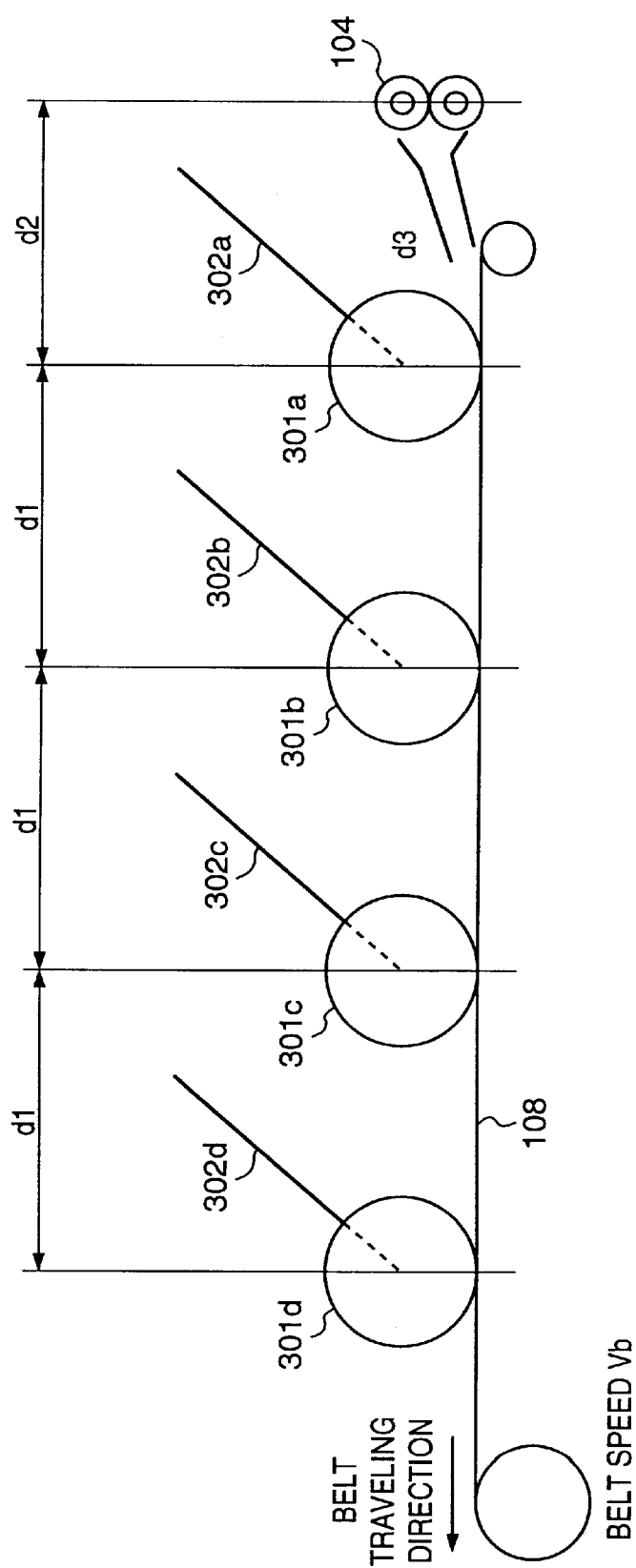
FIG. 5 is a sectional view showing the positional relationship between image formation stations in the embodiment.
Figure 6:
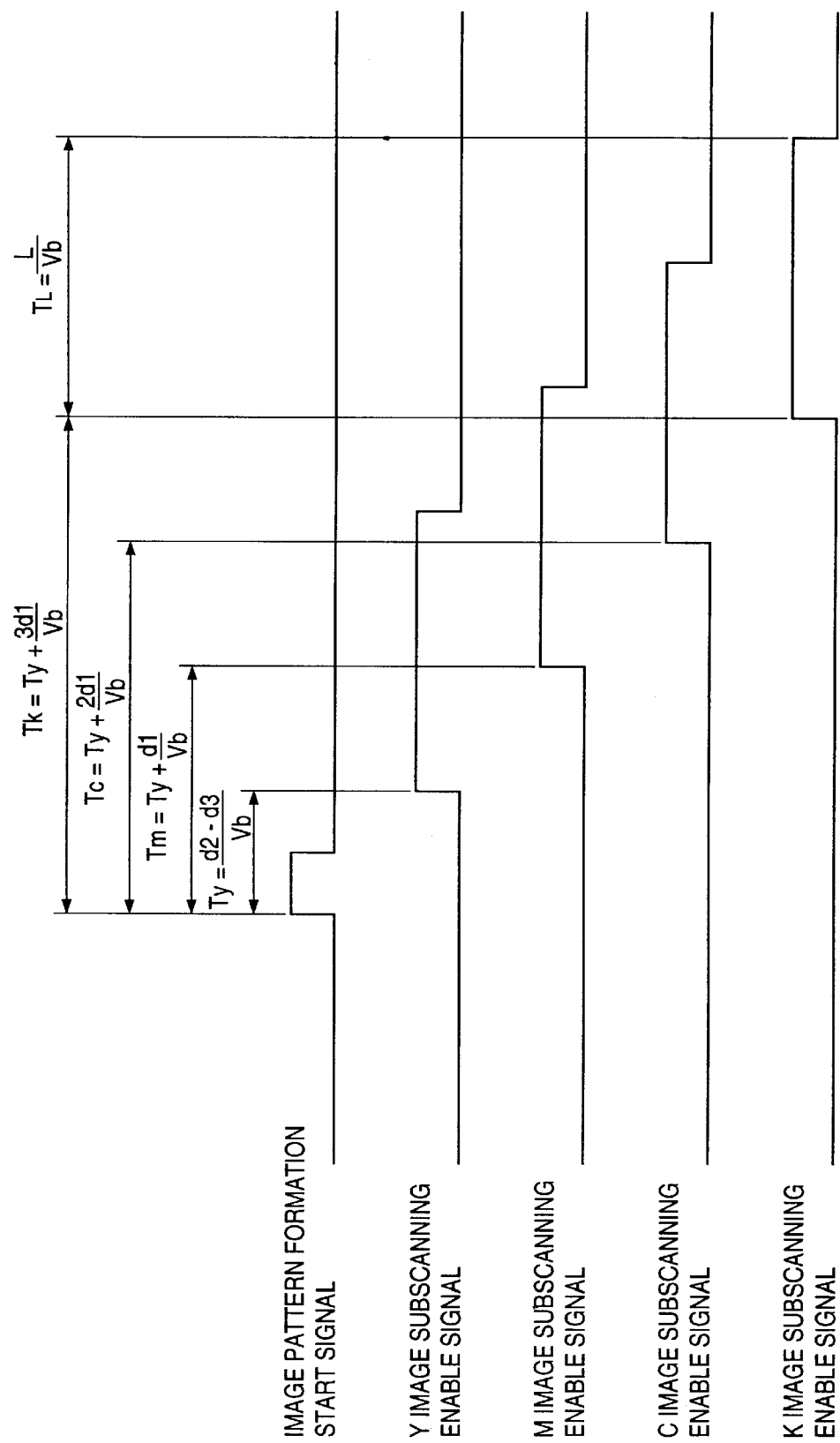
FIG. 6 is a timing chart showing image formation interval enable signals in the embodiment.

FIG. 5 shows the positional relationship between photosensitive drums 201a to 201d. The respective photosensitive drums are spaced apart from each other by a distance d1. The transfer belt 108 conveys a transfer medium (a recording sheet or the like) at a speed Vb. Images corresponding to the respective colors are formed on the photosensitive drums by exposure by laser scanning systems 302a to 302d on the basis of the image data of the respective colors. Let d3 be the distance from the Y image exposure position on the Y photosensitive drum to the transfer belt contact position, and d2 be the distance from the first registration rollers 104 to the center of the Y photosensitive drum 201a. FIG. 6 shows the exposure timing in subscanning in which the original image data stored in the memory are used to expose the photosensitive drums of the respective colors at the respective timings at which the transfer medium passes through the yellow (Y), magenta (M), cyan (C), and black (K) stations such that the developed images are superimposed and transferred onto the transfer medium. To convey the transfer medium stopped by the registration rollers onto the transfer belt, an image pattern formation start signal is activated at the same time when the registration rollers are started. The enable signals of the respective colors are activated with the delays given by the following equations with respect to the leading edge of the image pattern formation start signal:

$$Ty=(d2-d3)/Vb$$

$$Tm=Ty+d1/Vb$$

$$Tc = Ty + 2 \cdot d1/Vb$$

$$Tk = Ty + 3 \cdot d1/Vb$$

These enable signals are then inactivated in accordance with the length of the transfer medium in the subscanning direction.

Figure 7:
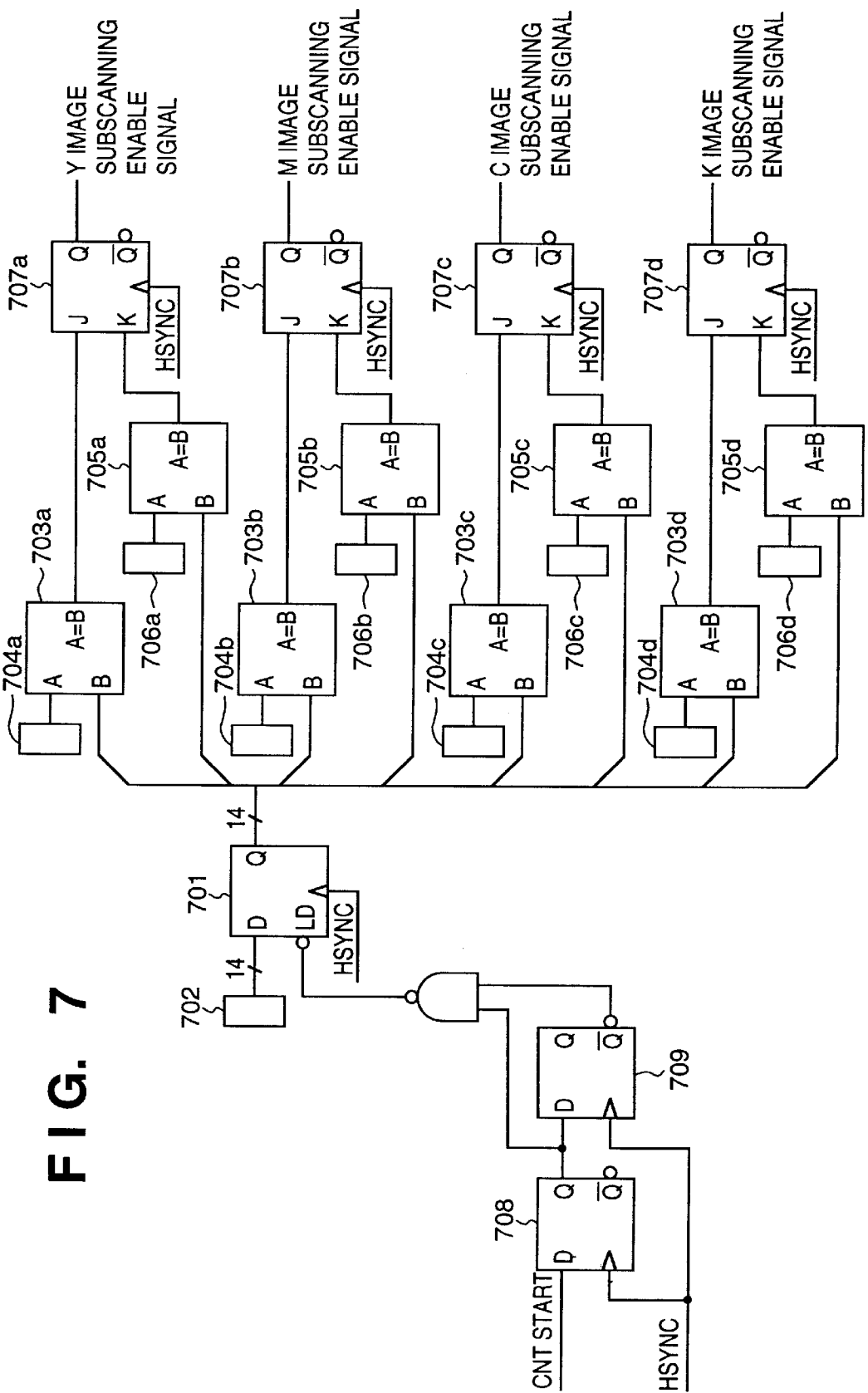
FIG. 7 is a block diagram showing a circuit for generating image formation interval enable signals.

FIG. 7 shows a circuit for generating subscanning enable signals. In the present invention, a time count is generated by using an HSYNC, one clock of which is synchronously generated when a laser beam scans one line.

Reference numeral 701 denotes a 14-bit counter for counting the HSYNC count in synchronism with each HSYNC; and 702, a register for storing the value to be loaded into the counter in response to the LOAD signal. Data is written in the register 702 by the CPU (not shown). In the present invention, 0 is written in this register. Reference numerals 703a to 703d denote comparators for comparing the respective color image enable leading edge timings. The CPU (not shown) writes HSYNC counts corresponding to Ty, Tm, Tc, and Tk in registers 704a to 704d for defining the respective color subscanning enable leading edge timings. When the HSYNC count in each register coincides with an output from the 14-bit counter 701, a coincidence signal is output.

Reference numerals 705a to 705d denote comparators for comparing the respective color image enable trailing edge timings. The CPU (not shown) writes HSYNC counts corresponding to Ty, Tm, Tc, and Tk in registers 706a to 706d for defining the respective subscanning enable trailing edge timings. When the HSYNC count in each register coincides with an output from the 14-bit counter 701, a coincidence signal is output. Letting L be the length of a paper sheet, a time Tp during which the enable signal is active is given by $$Tp = L/Vb$$

The numerical values to be written in the registers 706a to 706d are therefore numerical values which are obtained by adding the numerical value obtained by converting the time Tp into an HSYNC count to the numerical values written in the registers 704a to 704d.

In this case, the image pattern formation start signal in FIG. 6 is input to "CNT START" of a flip-flop 708 in FIG. 7, and the LOAD signal is input from two flip-flops 708 and 709 to the counter at the leading edge of the image pattern formation start signal. As a result, the counter is cleared to start counting. The counter 701 counts up HSYNC clocks. When the count value reaches a value corresponding to the yellow (Y) enable leading edge timing, the comparator 703a detects a coincidence and generates a coincidence signal 707a. The coincidence signal 707a is input to the J terminal of the JK flip-flop. As a result, a yellow (Y) subscanning enable signal changes to High level. When the count value increases to a value corresponding to an enable trailing edge timing, the comparator 705a detects a coincidence and outputs a coincidence signal 707a. The coincidence signal 707a is input to the K terminal of the JK flip-flop. As a result, the yellow (Y) subscanning enable signal changes to Low level. Magenta, cyan, and black subscanning enable signals are generated in the same manner as described above.

[Control of Document Handler]

Control of the document handler (to be referred to as DH hereinafter) 130 will be described next.

Figure 16:
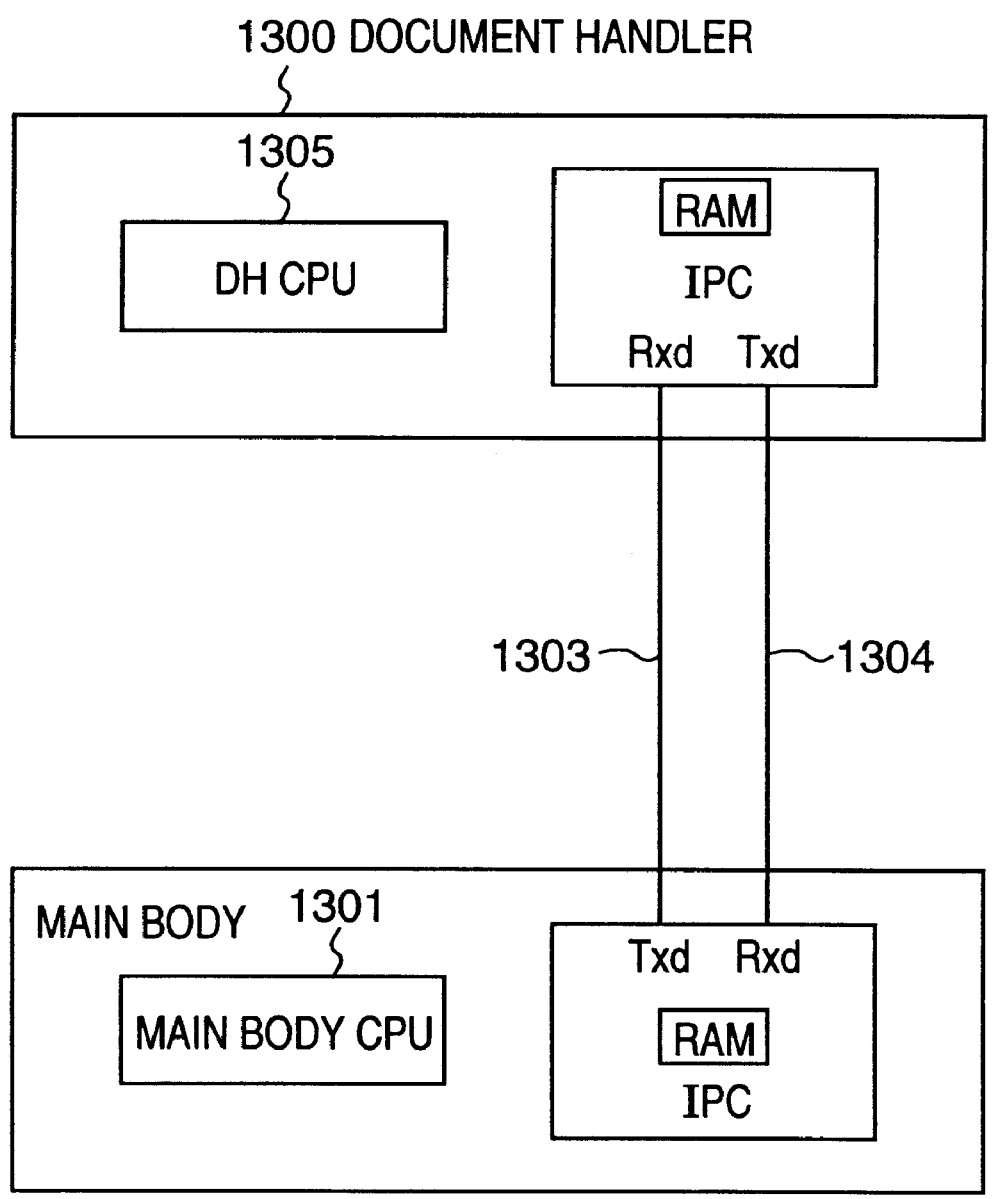
FIG. 16 is a block diagram showing the connection relationship between a document handler and the apparatus main body in the embodiment.

As shown in FIG. 16, the DH 130 and the apparatus body respectively have CPUs and communicate with each other through communication ICs called PCIs. When a main body CPU 1301 writes data in the RAM in the main body IPC, the data is transferred to the DH IPC through a communication line 1303, and the same contents are reproduced in the RAM in the DH IPC. A DH CPU 1305 reads out the contents of the RAM in the DH IPC, and determines a control instruction from the main body, thereby operating properly on the basis of the determined information. In contrast to this, when the DH CPU 1305 writes information in the RAM in the DH IPC, the information is reproduced in the RAM in the main body IPC through a communication line 1304. The main body CPU 1301 can acquire the information by reading out the information from the RAM in the IPC. Paper feed control specifications for the DH will be described next. FIG. 8 shows control communication specifications in the present invention.

The method of communicating/exchanging information between the main body and the document handler is described above. According to the present invention, the DH is controlled while each bit on the RAM in the IPC is regarded as a control signal. In this case, the ORG_FEED signal indicates an original feed start signal from the main body to the DH; the ORG_EJCT signal, an original discharge signal from the main body to the DH; and the DH_ACT signal, a DH in-operation signal from the DH to the main body.

When the main body activates the ORG_FEED signal to request the DH to feed the first original, the DH starts feeding the original, and activates the DH_ACT signal indicating that the DH is in operation. When this feed operation is complete, the DH inactivates the DH_ACT signal, and activates the COPY_REQ signal indicating to the main body that a copy operation (original read) can be performed. The main body detects the trailing edge of the DH_ACT signal, and inactivates the ORG_FEED signal to acknowledge the DH receipt of the information indicating the end of the feed operation from the DH. Upon inactivating the ORG_FEED signal, the main body starts to read the original image, and displays the image formation result on the preview monitor or performs a copy operation. The above description is associated with the operation for one original. FIG. 8 shows the operation for three originals. In this case, therefore, the above operation is performed three times. When the operations for the three originals are complete, since no further original is set, the main body activates the ORG_EJCT signal to request the DH to discharge the originals. Upon detection of the leading edge of this signal, the DH inactivates the COPY_REQ signal, and activates the DH_ACT signal to start discharging the originals. When the original discharging operation is complete, the DH inactivates the DH_ACT signal to notify the main body of the completion of the discharging operation. Upon detection of the trailing edge of this signal, the main body inactivates the ORG_EJCT signal. The communication specifications for control of the DH in handling three originals have been described above.

[Example of Application]

Figure 9A:
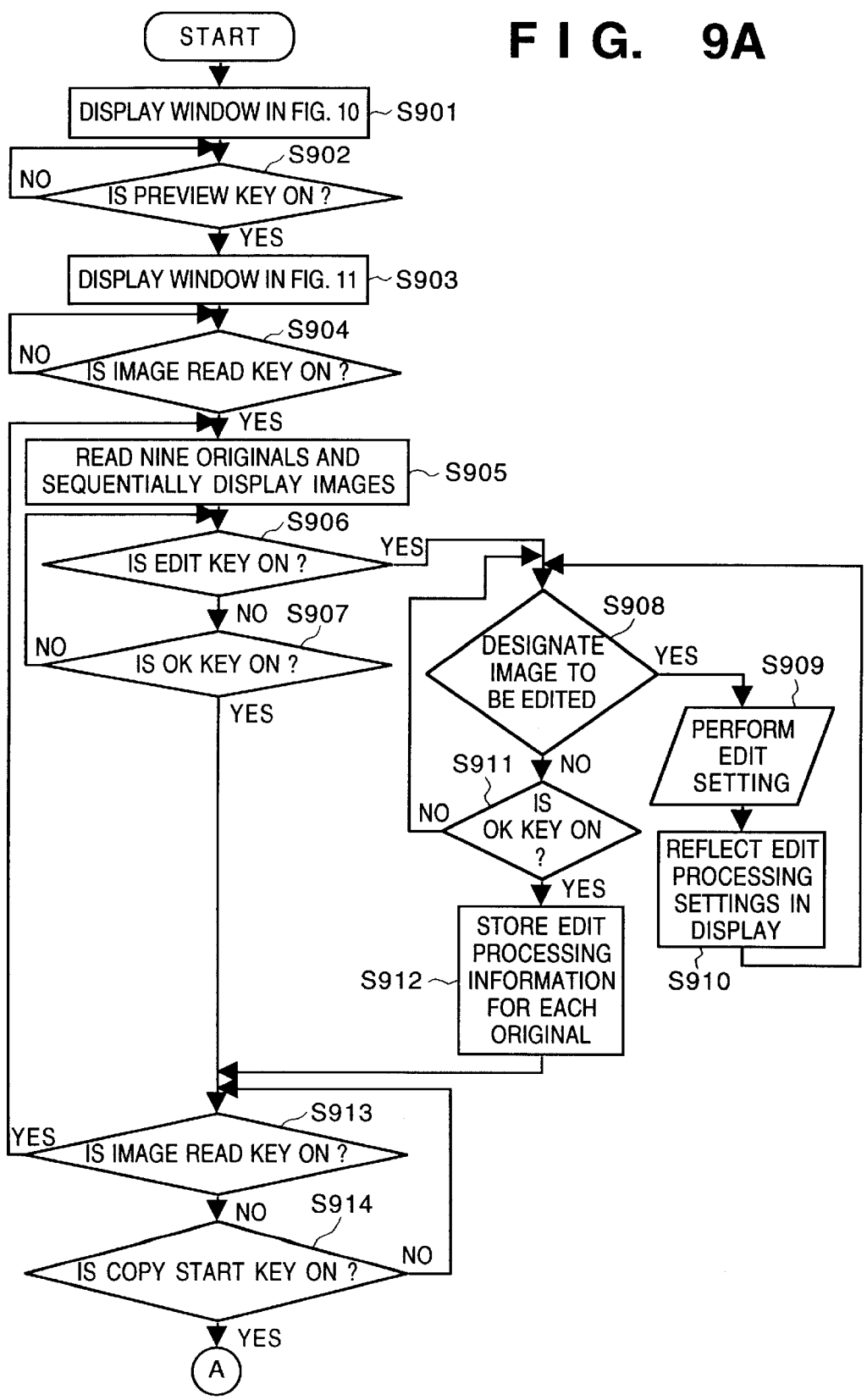
FIGS. 9A and 9B are flow charts showing the flow of processing.
Figure 9B:
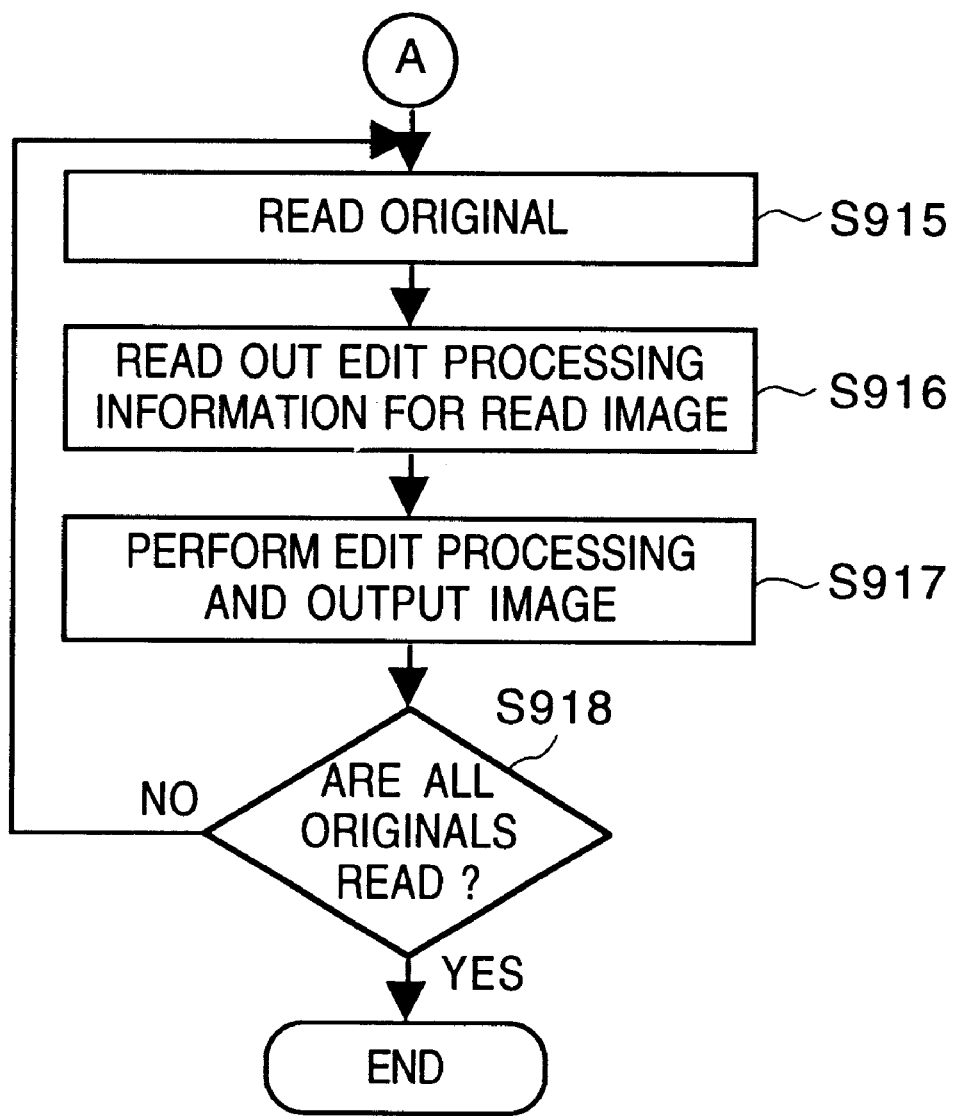
Figure 10:
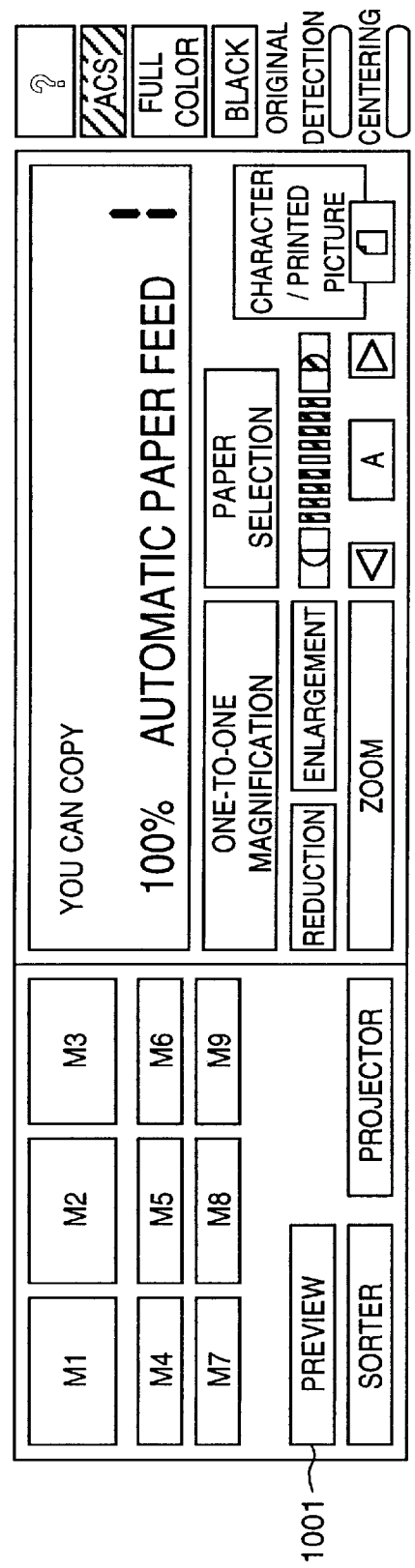
FIG. 10 is a view showing a preview operation window in the embodiment.

An application of the present invention using the DH and the preview system will be described next with reference to FIGS. 9A and 9B. FIG. 10 shows an operation panel in this embodiment.

First of all, the operation panel window shown in FIG. 10 is displayed (step S901). A preview key 1001 is then depressed (step S902). After the operation panel window changes to the preview window shown in FIG. 11 (step S903), an image read key 1101 is depressed (step S904). When this preview key 1001 is depressed, information about a predetermined magnification is set in each magnifying unit.

Figure 13:
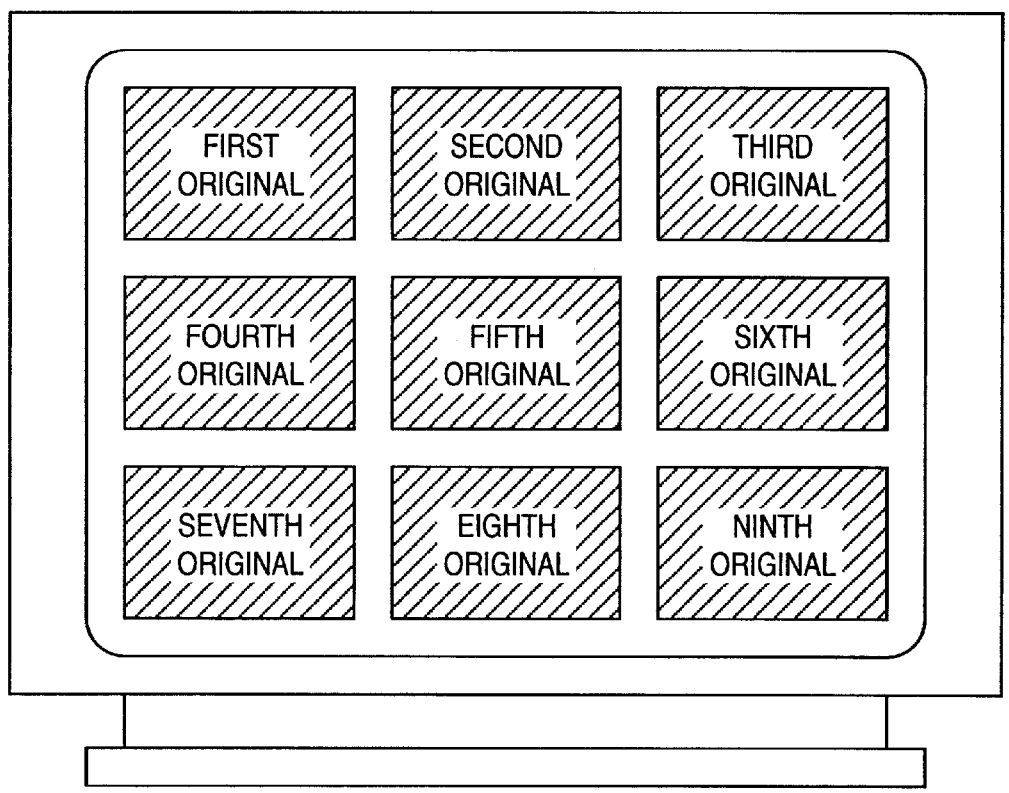
FIG. 13 is a view showing a sample display on a preview CRT in the embodiment.

Originals are sequentially fed by the DH, and the images read by the original reading unit are sequentially displayed on the CRT (step S905), as shown in FIG. 13. When nine originals are fed, and nine original images are displayed on the screen, the feed operation of the DH temporarily stops. Obviously, if less than nine originals are set on the DH, original images are displayed when all the set originals are read. That is, nine read images are not always displayed on the display screen.

If a given image displayed on the CRT differs from operator's intention, the operator depresses an edit key 1102 (step S906). If no edit processing is required, the OK key is depressed (step S907). When the edit key 1102 is depressed, the operation panel window changes to the one shown in FIG. 12. The operator then operates the operational panel to select an original number indicating one of the original images displayed on the preview CRT which is to be edited (step S908). When edit processing is performed in this state (step S909), image edit processing for the original is performed, and the resultant image appears on the CRT. When, for example, the second read image is to be edited, a button 1201 is selected (depressed). Thereafter, for example, setting for color conversion processing is performed to turn a white portion into a light blue portion. With this setting, the white portion of the image of the second read original changes to light blue on the CRT screen (step S910).

Assume that setting for color conversion is performed with respect to the position or area designated by the cursor, displayed on the CRT, which is moved by operating the cursor movement keys (the buttons with arrows pointing upward, downward, left, right, and obliquely) on the operational panel. Alternatively, a pointing device or the like may be operated. For example, colors are designated as follows. After or before an area is designated, the color to be converted and the color to be obtained after conversion are designated. The color designation operation itself may be performed as follows. For example, sample colors are displayed on the CRT, and a desired color is selected from the displayed colors. Alternatively, a desired color sample is designated on the operation panel.

If edit processing is to be performed for another original, a button indicating the corresponding number is selected (depressed), and edit processing conditions are set.

In this manner, edit processing can be arbitrarily designated for each of the nine originals displayed on the CRT. Note that designated edit processing is not limited to the above color conversion processing and includes various types of edit processing like those described in the description of the image processing unit in FIG. 2, e.g., processing for converting the color of a partial or entire area of an original image into a color different from the color of the original image, such as free color processing and paint processing, and processing for generating an image different from an original image, such as processing of synthesizing the original image with a stored image.

Figure 11:
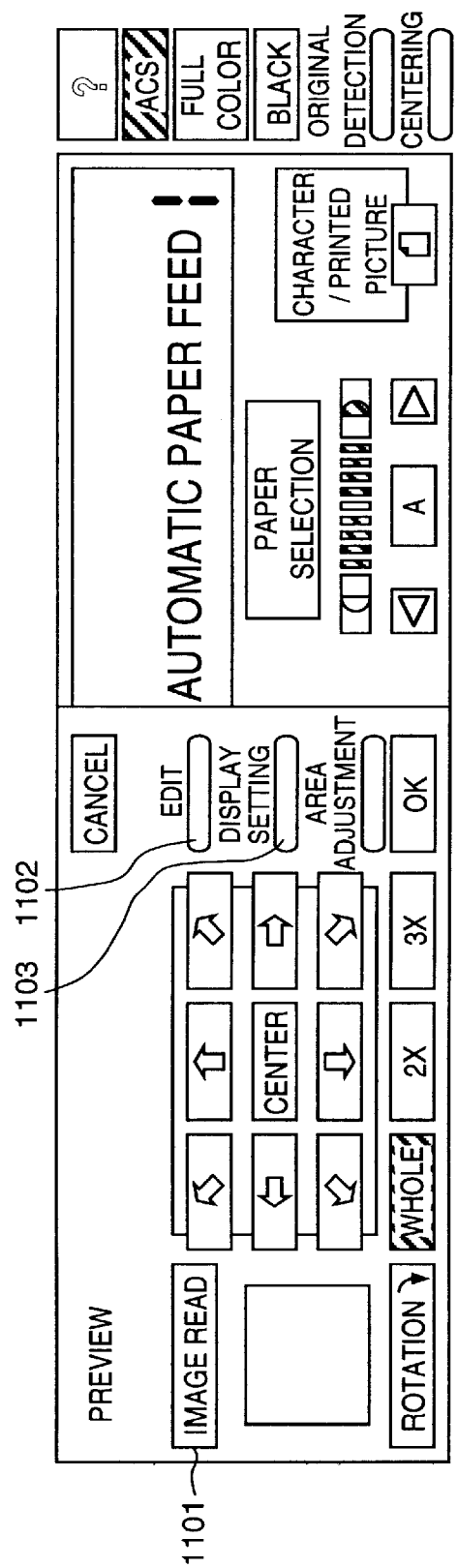
FIG. 11 is a view showing a preview operation window in the embodiment.
Figure 12:
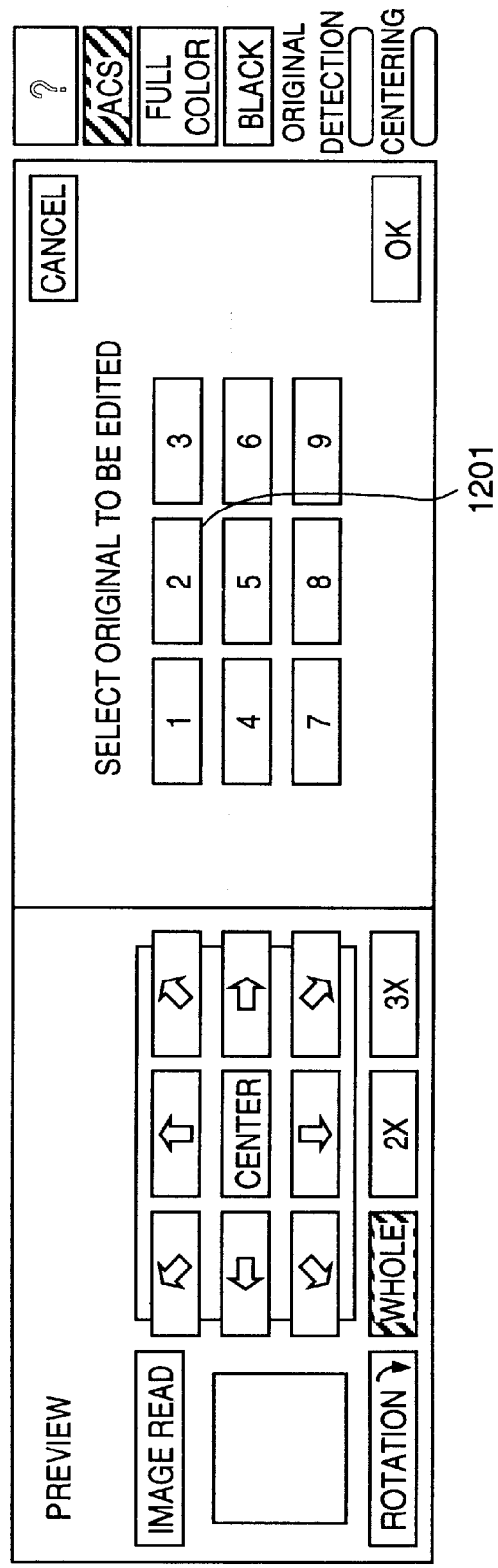
FIG. 12 is a view showing a preview operation window in the embodiment.

In this manner, the edit processing conditions can be independently set for each read image. If an edited image on the CRT is checked, and it is determined that the image coincides with operator's intention, the OK key in FIG. 12 is depressed (step S911), and the window in FIG. 11 is restored. At this time, the edit information for each original is stored in a predetermined storage device in correspondence with the corresponding original number (step S912). When the image read key 1101 is depressed (step S913), the DH feeds next nine originals, i.e., the 10th to 18th originals, and displays images of the nine originals on the CRT (step S905).

Assume that the above operation is repeated, and all the originals are processed. In this case, when the copy start key is depressed in the state shown in FIG. 10 (step S914), originals are fed from the DH, and edit processing based on the edit processing information for each original, stored in the storage device in advance in correspondence with each original, is performed for each original. Finally, all the resultant images are printed out at once.

More specifically, the above edit information for each original is stored in the predetermined storage device. Every time one original is read (step S915), therefore, the edit information for the read original is read out from the storage device (step S916), and conversion processing data of the bit map scheme which is based on the edit information is developed in the area memory unit 231. The information developed in the area memory unit 231 is constituted by a binary signal indicating whether the corresponding area is an area to be subjected to edit processing, the color to be converted, and the color obtained upon conversion. When the binary signal form the area memory unit 231 indicates that the corresponding area is an area to be subjected to edit processing, and the output data from the output DTOP 226 is the color to be converted, the editing circuit 213 converts the color into the color to be obtained upon conversion and outputs the resultant image (step S917).

The above processing in steps S915 to S918 is repeated the number of times corresponding to the number of originals. If it is determined that images of all the originals are completely output (step S918), the processing is terminated.

In the above embodiment, images of nine originals are displayed on the preview screen at once. However, the number of originals is not limited to nine. A case in which the number of originals can be selected will be described below.

Figure 14:
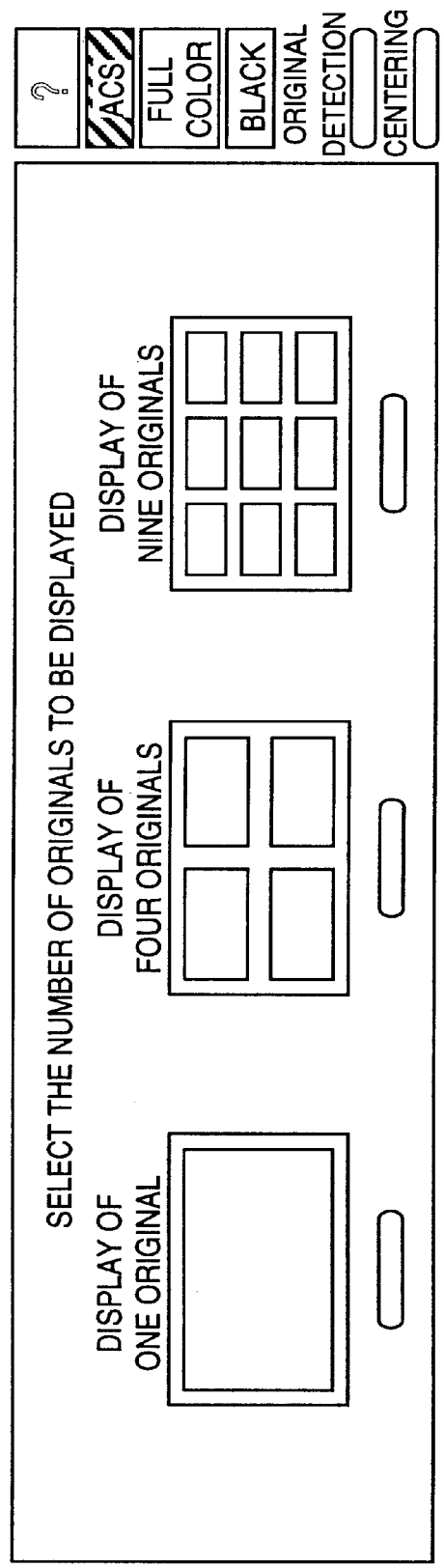
FIG. 14 is a view showing an operation window for selecting the number of originals to be displayed on the preview CRT in the embodiment.
Figure 15:
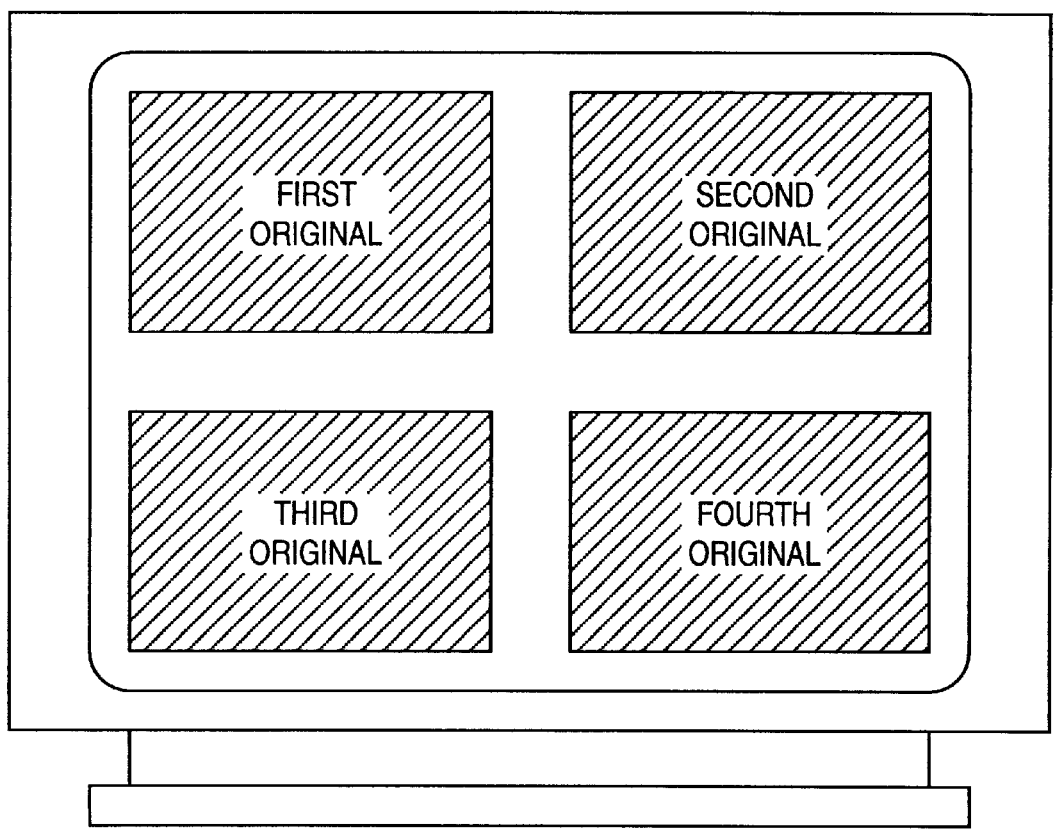
FIG. 15 is a view showing another sample display on the preview CRT in the embodiment.

When a display setting key 1103 in FIG. 11 is depressed, the window on the operation panel changes to a window for setting the number of originals to be displayed on the preview CRT. FIG. 14 shows this window. Referring to FIG. 14, the message "Select the number of originals to be displayed" is displayed. The operator then selects "display of one original", "display of four originals", or "display of nine originals". If, for example, the operator selects "display of four originals", the original reading unit reads four originals at a time. The read images are sequentially displayed on the CRT, as shown in FIG. 15.

In the above description, when preview display and edit processing are performed, and a copy start is designated, original images are loaded again and processed in accordance with the designated edit contents. Assume, however, that this apparatus includes a large-capacity storage device (e.g., a hard disk unit or a magnetooptical disk). In this case, if images obtained from the scanner before edit processing are stored in this storage device, the original image data need not be loaded again. In general, however, since a copying machine has or can have a DH, the DH can be used. The above processing is therefore preferable in terms of cost.

[Modification]

In the above embodiment, the present invention is applied to the copying machine. However, the present invention is not limited to this.

FIG. 17 shows the cross-sectional structure of an apparatus as a modification of the embodiment.

Referring to FIG. 17, reference numeral 130 denotes an apparatus in which a color film is loaded to project an image; and 132, a mirror for reflecting the projected image. Note that a plurality of films can be loaded into the projection apparatus 130, and frame feed and the like are performed in accordance with instructions from an image processing unit 106. That is, the projection apparatus 130 is electrically connected to this apparatus through an interface (not shown).

A projected image is formed on the CCD 105 by the same principle as that of the above embodiment. This modification differs from the above embodiment in that when a film image is to be read, the lamp for exposing an original is not driven. Other arrangements and operations are the same as those in the above embodiment.

As described above, this embodiment includes an original feed means for feeding an original to an original reading unit, a read means for reading an image by scanning the original fed to the reading unit, a storage means for storing the image, a means for performing at least one edit process for the image or the stored information, and a display means for displaying the edit process result. With this arrangement, a plurality of originals are read, and the results obtained by editing the plurality of originals are displayed by the display means. Since the edit effects obtained by the edit process means can be checked in units of displayed originals, the productivity can be improved in terms of the time required to check the edit effects. In addition, since no images are output onto paper sheets until the edit effects are checked by the operator, a reduction in cost can be attained.

In addition, this embodiment includes an original feed means for feeding an original to an original reading unit, a read means for reading an image by scanning the original fed to the reading unit, a storage means for storing the image, a means for performing at least one edit process for the image or the stored information, and a display means for displaying the edit process result. With this arrangement, in the edit process setting mode set by the operator with the edit process means, edited images of a plurality of originals are displayed at predetermined time intervals, thereby allowing the operator to check the edit effects. With this operation, the productivity can be improved in terms of the time required to check the edit effects on all the originals. In addition, since no images are output onto paper sheets until the edit effects are checked by the operator, a reduction in cost can be attained.

Furthermore, this embodiment includes a means in which a plurality of color films can be loaded and on which light beams sequentially emitted by a light source and transmitted through the color films are formed into images, a read means for reading images by scanning the film images, a storage means for storing the images, a means for performing at least one edit process for the image or the stored information, and a display means capable of displaying the edit process result. With this arrangement, in the edit process setting mode set by the operator with the edit process means, edited images of a plurality of originals are displayed at predetermined time intervals, thereby allowing the operator to check the edit effects. With this operation, the productivity can be improved in terms of the time required to check the edit effects on all the originals. In addition, since no images are output onto paper sheets until the edit effects are checked by the operator, a reduction in cost can be attained.

In the above embodiment, the present invention is applied to a single copying machine. However, the present invention is not limited to this. For example, the present invention may be applied to a system constituted by an image reader, an information processing apparatus (e.g., a personal computer) for editing images, and a printer.

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiment may be realized not only by executing the readout program code by the computer but also by some or all of actual processing operations executed by an OS (operating system) running on the computer on the basis of an instruction of the program code.

Furthermore, the functions of the above-mentioned embodiment may be realized by some or all of actual processing operations executed by a CPU or the like arranged in a function extension board or a function extension unit, which is inserted in or connected to the computer, after the program code read out from the storage medium is written in a memory of the extension board or unit.

As has been described above, according to the present invention, when edit processing is to be performed for a plurality of originals, and the resultant images are to be output, all the originals can be edited at once, and all the resultant images can be output.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for reading an original image and printing the original image upon performing edit processing therefor in accordance with an edit processing condition, comprising:

read means for pre-reading a plurality of original images;

setting means for arbitrarily setting an editing processing condition for each of the plurality of original images pre-read by said read means;

display means for simultaneously displaying processing results obtained by processing the plurality of pre-read original images processed in accordance with the edit processing conditions set by said setting means in correspondence with the respective original images;

storage means for storing the edit processing conditions set by said setting means in correspondence with the original images for which the edit processing conditions are set;

instruction means for instructing an image copy instruction; and copy control means for, in response to the copy instruction by said instruction means, causing said read means to read each of the plurality of original images sequentially, processing an original image in accordance with the edit processing conditions stored in said storage means in correspondence with the respective original images at each time one of the plurality of original images is read, and printing the processed original images at each time an original image is processed without keeping all of the original images in a memory.

2. The apparatus according to claim 1, wherein the edit processing is processing for converting a color on the original image into a color different from the color of the original image.

3. The apparatus according to claim 1, wherein said copy control means comprises image formation means for forming an image on a recording sheet.

4. The apparatus according to claim 1, wherein said read means reads an original image by exposing an original containing the original image.

5. The apparatus according to claim 4, further comprising convey means for automatically conveying the original,
wherein said read means reads the original conveyed by said convey means.

6. The apparatus according to claim 1, wherein said read means comprises means for reading an original image by exposing a film containing the original image.

7. The apparatus according to claim 1, wherein said read means reads the same original image as first and second original images at least twice,
the image to be displayed by said display means is processed on a basis of the first original image, and
the image to be printed by said copy control means is processed on a basis of the second original image.

8. An image processing apparatus for reading an original image and printing the original image upon performing edit processing therefor in accordance with an edit processing condition, comprising:
read means for pre-reading a plurality of original images;
setting means for arbitrarily setting an edit processing condition for each of the plurality of original images pre-read by said read means;
storage means for storing the edit processing conditions set by said setting means in correspondence with the original images for which the edit processing conditions are set;
instruction means for instructing an image copy instruction; and
copy control means for, in response to the copy instruction by said instruction means, causing said read means to read each of the plurality of original images sequentially, processing an original image in accordance with the edit processing conditions stored in said storage means in correspondence with the respective original images at each time one of the plurality of original images is read, and printing the processed original images at each time an original image is processed without keeping all of the original images in a memory.

9. The apparatus according to claim 8, wherein the edit processing is processing for converting a color on the original image into a color different from the color of the original image.

10. The apparatus according to claim 8, wherein said copy control means comprises image formation means for forming an image on a recording sheet.

11. The apparatus according to claim 8, wherein said read means comprises means for reading an original image by exposing an original containing the original image.

12. The apparatus according to claim 11, further comprising convey means for automatically conveying the original,
wherein said read means reads the original conveyed by said convey means.

13. The apparatus according to claim 8, wherein said read means comprises means for reading an original image by exposing a film containing the original image.

14. An image processing method of reading an original image and printing the original image upon performing edit processing therefor in accordance with an edit processing condition, comprising:
a reading step of pre-reading a plurality of original images;
a setting step of arbitrarily setting an edit processing condition for each of the plurality of original images pre-read in the reading step;
a display step of simultaneously displaying processing results obtained by processing the plurality of processed pre-read original images processed in accordance with the edit processing conditions set in the setting step in correspondence with the respective original images;
a storage step of storing the edit processing conditions set in the setting step in correspondence with the original images for which the edit processing conditions are set;
an instruction step of instructing an image copy instruction; and
a copy control step of, in response to the copy instruction by said instruction step, causing said reading step to read each of the plurality of original images sequentially, processing an original image in accordance with the edit processing conditions stored in the storage step in correspondence with the respective original images at each time one of the plurality of original images is read, and the original images at each time an original image is processed without keeping all of the original images in a memory.

15. The method according to claim 14, wherein the edit processing is processing for converting a color on the original image into a color different from the color of the processed original image.

16. The method according to claim 14, wherein the copy control step comprises an image formation step of forming an image on a recording sheet.

17. The method according to claim 14, wherein the reading step reads an original image by exposing an original containing the original image.

18. The method according to claim 17, further comprising a conveying step of automatically conveying the original,
wherein said reading step reads the original conveyed by said conveying step.

19. The method according to claim 14, wherein the reading step comprises the a step of reading an original image by exposing a film containing the original image.

20. The method according to claim 14, wherein the reading step comprises reading the same original image as first and second original images at least twice,
the image to be displayed is processed on a basis of the first original image, and
the image to be printed by said copy control step is processed on a basis of the second original image.

21. An image processing method of inputting reading an original image and printing the original image upon performing edit processing therefor in accordance with an edit processing condition, comprising:
a reading step of pre-reading a plurality of original images;
a setting step of arbitrarily setting an edit processing condition for each of the plurality of original images pre-read in the reading step;
a storage step of storing the edit processing conditions set in the setting step in correspondence with the original images for which the edit processing conditions are set;

an instruction step of instructing an image copy instruction; and a copy control step of, in response to the copy instruction by said instruction step, causing said reading step to read each of the plurality of original images sequentially, processing an original image in accordance with the edit processing conditions stored in the storage step in correspondence with the respective original images at each time one of the plurality of original images is read, and printing the processed original images at each time an original image is processed without keeping all of the original images in a memory.

22. The method according to claim 21, wherein the edit processing is processing for converting a color on the original image into a color different from the color of the original image.

23. The method according to claim 21, wherein the copy control step comprises an image formation step of forming an image on a recording sheet.

24. The method according to claim 21, wherein the reading step comprises a step of reading an original image by exposing an original containing the original image.

25. The method according to claim 24, further comprising a conveying step of automatically conveying the original, wherein said reading step reads the original conveyed by said conveying step.

26. The method according to claim 21, wherein the reading step comprises a step of reading an original image by exposing a film containing the original image.

* * * * *

UNITED STATES PATENT AND TRADEMARK OFFICE
CERTIFICATE OF CORRECTION

PATENT NO.     : 6,249,361 B1
DATED          : June 19, 2001
INVENTOR(S)    : Motoaki Tahara It is certified that error appears in the above-identified patent and that said Letters Patent is hereby corrected as shown below:

Title page,
Item [56], References Cited, OTHER PUBLICATIONS,
"Mark" should read -- Mary --.

Column 1,
Line 23, "has" should read -- have --;
Line 25, "displays" should read -- display --; and
Line 36, "describe" should read -- described --.

Column 6,
Line 43, "designed" should read -- designated --.

Column 16,
Line 46, "the" should be deleted.

Signed and Sealed this

Thirteenth Day of August, 2002

Attest:

Attesting Officer

JAMES E. ROGAN
*Director of the United States Patent and Trademark Office*